(12) United States Patent
Mahlab

(10) Patent No.: US 7,187,862 B2
(45) Date of Patent: Mar. 6, 2007

(54) METHOD OF LOCATING FAULTS IN OPTICAL TELECOMMUNICATION NETWORKS

(75) Inventor: Uri Mahlab, Or Yehuda (IL)

(73) Assignee: ECI Telecom Ltd., Petach Tikva (IL)

( * ) Notice: Subject to any disclaimer, the term of this patent is extended or adjusted under 35 U.S.C. 154(b) by 632 days.

(21) Appl. No.: 10/392,975

(22) Filed: Mar. 21, 2003

(65) Prior Publication Data
US 2003/0180044 A1 Sep. 25, 2003

(30) Foreign Application Priority Data
Mar. 21, 2002 (IL) .................................... 148811

(51) Int. Cl.
*H04B 10/08* (2006.01)

(52) U.S. Cl. .................... 398/10; 398/17; 398/31; 398/32; 398/33

(58) Field of Classification Search .............. 398/6, 398/7, 9, 10, 16, 17, 83, 30–33
See application file for complete search history.

(56) References Cited

U.S. PATENT DOCUMENTS

| 5,436,750 | A | * | 7/1995 | Kawano ...................... 398/10 |
| 5,654,816 | A | | 8/1997 | Fishman et al. |
| 5,892,606 | A | * | 4/1999 | Fatehi et al. ................ 398/181 |
| 6,101,012 | A | * | 8/2000 | Danagher et al. .............. 398/1 |
| 6,115,154 | A | | 9/2000 | Antoniades et al. |
| 6,141,125 | A | * | 10/2000 | Blair et al. .................... 398/32 |
| 6,285,475 | B1 | | 9/2001 | Fee |
| 6,317,231 | B1 | * | 11/2001 | Al-Salameh et al. ......... 398/34 |
| 2004/0109685 | A1 | * | 6/2004 | Wan et al. .................... 398/41 |

FOREIGN PATENT DOCUMENTS

| EP | 0 782 279 A | 7/1997 |
| EP | 0 794 628 A | 9/1997 |
| JP | 62 116029 A | 5/1987 |

OTHER PUBLICATIONS

G.R. Hill et al.: "A Transport Network Layer Based on Optical Network Elements" Journal of Lightwave Technology, IEEE Service Center, New York, NY, US, vol. 11, No. 5/6, May 1, 1993, pp. 667-676, XP000396700. ISSN: 0733-8724 Chapter B. Pilot Tone Supervisory System, p. 674-675.
F. Heismann et al.: "Signal Tracking and Performance Monitoring in Multi-wavelength Optical Networks" 22$^{nd}$ European Conference on Optical Communication, vol. 3, Sep. 15, 1996, pp. 47-50, XP010303119 *abstract* ch. Signal Identification on pp. 3.47 and 3.49 only* *p. 3.49 lines 7-12* .

* cited by examiner

*Primary Examiner*—Dalzid Singh
(74) *Attorney, Agent, or Firm*—Browdy and Neimark, PLLC

(57) ABSTRACT

A method, a system and a module are proposed for detecting and locating faults in an optical multi channel network composed of network nodes. The method includes assigning different sub-carrier pilot tones to a number of the nodes comprising Network Elements (NE), applying the different sub-carrier pilot tones to any signal added to the network via the respective nodes, checking presence of one or more of the sub-carrier pilot tones at one or more points of the network, and, based on results of the checking, locating a faulty section of the network in case a fault occurred.

6 Claims, 4 Drawing Sheets

METHOD OF LOCATING FAULTS IN OPTICAL TELECOMMUNICATION NETWORKS

FIELD OF THE INVENTION

The present invention relates to a method of detecting and locating faults in optical telecommunication networks.

BACKGROUND OF THE INVENTION

There is quite a known principle in the art of optical telecommunication networks, to detect a fiber cut by analyzing power of a signal transmitted over the span in which the fiber cut may occur. The signal may be, for example, an optical carrier wavelength assigned to a particular optical channel, or a plurality of optical carrier wavelengths transmitted over one and the same optical fiber.

According to another known approach, a pilot tone is added to the data transmitted over a fiber path in the network. Absence of the pilot tone at a particular location of the network manifests the presence of a fiber cut before this particular location.

U.S. Pat. No. 6,115,154 describes a method and a system for detecting fiber cuts in an optical network regardless of the number of EDEAs (amplifiers) that are located between the fiber cut and the monitor point. The power of a marker wavelength is compared to the power of a nearby spectral region. Where the comparison indicates that the power ratio is approximately equal to unity, a flag is raised indicating that there is a fiber cut.

U.S. Pat. No. 6,285,475 B1 proposes detecting optical faults by tapping a portion of a data signal from along a fiber network link at an optical switching site or node. A sub-carrier modulation signal can be added to the high rate data signal prior to transport over the link. The sub-carrier signal is significantly lower in both frequency and amplitude than the main data signal so as to not impact reliable reception of the main data signal. A low-pass filter tuned to the sub-carrier modulation signal filters the tapped data signal. By detecting the sub-carrier data signal, fault can be determined inexpensively and reliably in the presence of optical noise.

The problem of the above solutions is that neither of them enables precise location of a fiber cut, i.e., pointing out a specific segment of the network where a failure occurred.

The above problem, in particular, stems from the fact that any optical network comprises add-drop network elements. Any optical carrier wavelength or a pilot sub-carrier tone may disappear just because one or more optical channels marked by them are dropped by an OADM (Optical Add Drop Multiplexer); due to that detection of a fiber cut becomes problematic.

OBJECT OF THE INVENTION

It is therefore an object of the present invention to provide a method and a system for precise location of a fault (such as a fiber cut or an equipment failure) in an optical network.

SUMMARY OF THE INVENTION

A method of detecting and locating faults in an optical multi channel network (such as WDM) composed of network nodes, the method including:

assigning sub-carrier pilot tones to a number of the nodes comprising Network Elements NE (such as Optical Add-Drop Multiplexers (OADMs) or switches), wherein each of said tones having frequency different from those of multiple optical channels of the network and different from those of sub-carrier pilot tones assigned to other network nodes, applying said different sub-carrier pilot tones to any signal added to the network via the respective nodes, checking presence of one or more of the sub-carrier pilot tones at one or more points of the network, and, based on results of the checking, locating a faulty section of the network in case a fault occurred.

Preferably, said one or more points of the network are respectively positioned at one or more of said nodes.

The locating of a faulty section is preferably performed by relating the absent pilot tone, if any, with the network section associated with the Network Element (NE) from which said tone should originate.

More particularly, the location of the faulty section is selecting a section in the network associated with a particular one of said Network Elements (NE) responsible for "marking" the added optical channels with the sub-carrier which is absent but should be present at the particular point of the network.

Preferably, the checking is accomplished by filtering a split out portion of the incoming optical signal for determining which sub-carrier pilot tone(s) is absent and which sub-carrier pilot tone(s) are present.

For the location of a fault, there is a need in comparing the information on the sub-carriers (status) with a so-called correct picture of the network (the one reflecting which sub-carriers should be present at this particular point).

Preferably, the correct picture of the network is known to a so-called Network Manager (NM) and is formed from at least a) information on the optical channels added and dropped at each of said Network Elements, and b) data on sub-carriers assigned to each of said Network Elements.

It is understood that the Network Manager must be continuously updated about changes in the topology and the correct picture of the network.

The Network Manager is to be understood as a system of software programs and/or hardware equipment ensuring management of the network. The Network Manager may be either fully automatic or include participation of a human operator.

For example, a number of local decisions on the fault location may be made automatically at local point(s) of the network and displayed on a screen of a control room of the network, so that the final location of the fault be made by the operator who is also responsible for taking steps for eliminating the faults. Alternatively, the NM may be responsible of collecting the status information from the local point(s) of the network and making the fault detection and location decisions.

For performing the comparison at a local point of the network, the information on the correct network picture can be obtained from the NM or introduced manually. Alternatively, the comparison can be performed by the Network Manager if the information on the checked sub-carrier at a particular local point is transferred to the Network Manager.

The final fault location is preferably performed in the Network Manager since it requires analysis of the information or local decisions obtained from a number of local points (NE) of the network.

The fault location preferably comprises discriminating between a fiber cut occurring in a network span associated with the Network Element originating the sub-carrier detected to be absent, and between an equipment fault in said Network Element. Owing to the fact that the sub-carrier pilot tones assigned to different nodes "mark" different segments of the network, the method enables checking one local decision on the fault location by another local decision, thereby locating the fault with maximal accuracy.

The Network Element (NE) suitable for the above method is a device capable of adding one or more optical channels to the mentioned optical network. According to the above condition, the NE can be a switching device of the kind suitable for interconnecting two or more adjacent networks. Another example of the NE is an Optical Add Drop Multiplexer (OADM). A third example is a terminal network element injecting a number of optical channels into the network.

The method may additionally comprise a step of measuring power of a particular sub-carrier pilot tone if present at a particular point of the network and comparing its power with a predetermined expected power level. The expected power level value(s) can be part of the correct picture of the network. Preferably, the step of measuring said power is performed periodically and can thereby be used for monitoring the network performance, for example for revealing degradation of a fiber at specific sections of the network and predicting faults. The periodic character of the measurements enables excluding random errors and considering fluctuations caused, for example, by temperature changes.

There is also provided a system intended for a multi-channel optical network comprising a number of nodes, the system comprising Network Elements (NE) respectively located at the nodes, wherein each of the NE being capable of adding one or more optical channels to the network and provided with equipment for modulating all optical channels added at said node by a unique frequency of a sub-carrier pilot tone, the sub-carrier pilot tones at different Network Elements differing from one another and from frequencies of the optical channels, the system also comprising at least one checking device located at a particular point of the network and capable of detecting presence of one or more of said sub-carrier pilot tones at said particular point, the system being capable of processing the information detected at each of said checking devices, together with a correct picture of the network, and based on results of the processing, detecting a fault, if any, and locating the fault in the network.

The above-mentioned correct picture of the network is usually created in a Network Manager (NM) which can be considered part of the system, said correct picture comprises complete and update data on added and/or dropped optical channels at each of said Network Elements and on the sub-carrier pilot tones over the network.

The processing can be provided at the checking device(s) upon obtaining the required network picture information from the Network Manager (NM). Fragments of the correct picture of the network, obtained form the NM, can be stored at the checking devices located at the Network Elements.

However, the processing is preferably provided by the Network Manager upon obtaining information on the detected present/absent sub-carrier pilot tones from the checking devices. Therefore, the NM is preferably responsible for the fault detection and location.

Actually, the NM locates a fault by pointing out a section in the network associated with a particular NE responsible for introducing such a sub-carrier (pilot tone) which is absent but should be present at the checking device.

Owing to the capability of comparing the correct picture of the network with information on the present and/or absent sub-carriers at the Network Elements, the system is capable of discriminating between fiber cuts and between equipment faults in the NE associated with the section pointed out.

The above system is preferably suitable for point-to point and ring network configurations, and for combinations thereof.

Most preferably, the checking devices are positioned at the respective nodes and form integral part of the Network Elements (NE).

However, according to yet another aspect of the invention, there can be provided a sub-carrier module suitable for being used in any point of a multi-channel optical network (and in the system according to the invention), and comprising a modulating unit for modulating one or more optical channels, to be added to the network at a particular point, by a unique frequency of a sub-carrier pilot tone from a list of tones, said sub-carrier pilot tones differing by frequency from other tones of the list and from the optical channels, a checking unit capable of detecting presence of one or more of the sub-carrier pilot tones of the list at a particular point where the checking unit is located, wherein said modulating unit and checking unit being operative either separately or together.

Preferably, the checking unit is capable of communicating with a Network Manager system.

Such a sub-carrier module can be placed at any point of the network as a stand-alone device, but preferably is adapted to operate at a network node, in conjunction with a switching device capable of adding to the network one or more optical channels. In the last embodiment, the module is already not a stand-alone device, but forms integral part of the Network Element.

The sub-carrier module is operative to communicate with the Network Manager for information exchange and for detecting and locating faults in the network.

In case the sub-carrier module is not provided with prior information on the correct picture of the network, its checking unit will be capable of forwarding reports on status of the absent and present sub-carrier pilot tones, say to the Network Manager. If the sub-carrier module is provided with such prior information, the checking module is capable of comparing it with the status and producing a local decision on the fault detection and location which can be either confirmed or corrected.

One further aspect of the invention is a Network Element (NE) capable of adding one or more optical channels to a multi-channel optical network, the NE being equipped with a modulation unit capable of impressing optical signals of the one or more optical channels added to the network via the NE, with a particular sub-carrier pilot tone having frequency differing from those of the multiple optical channels, and also equipped with a checking unit for determining presence of one or more of the sub-carrier pilot tones differing form those of said particular pilot tone.

There is also proposed a network node comprising a Network Element (NE) capable of adding to a multi-channel optical network one or more optical channels, the node being equipped with a modulation unit capable of impressing optical signals of the one or more optical channels added at the node with a particular sub-carrier pilot tone having frequency differing from those of other nodes and those of the multiple optical channels, and also equipped with a checking unit for determining presence of one or more of the sub-carrier pilot tones at the node—for further processing the results in order to detect a fault and locate it in the network.

With respect to the system, the sub-carrier module, the node and the Network Element itself being capable of adding to the network one or more optical channels, said NE may constitute, for example, an OADM or a switching device connecting two or more adjacent networks. A third example of a such NE is a terminal element of the network which transmits a number of optical channels to the network.

Further details of the invention will be apparent from the figures and the description which follow.

BRIEF DESCRIPTION OF THE DRAWINGS

The invention will be further described and illustrated by way of examples and with the aid of the following non-limiting drawings, in which.

DETAILED DESCRIPTION OF THE PREFERRED EMBODIMENTS

Figure 1:
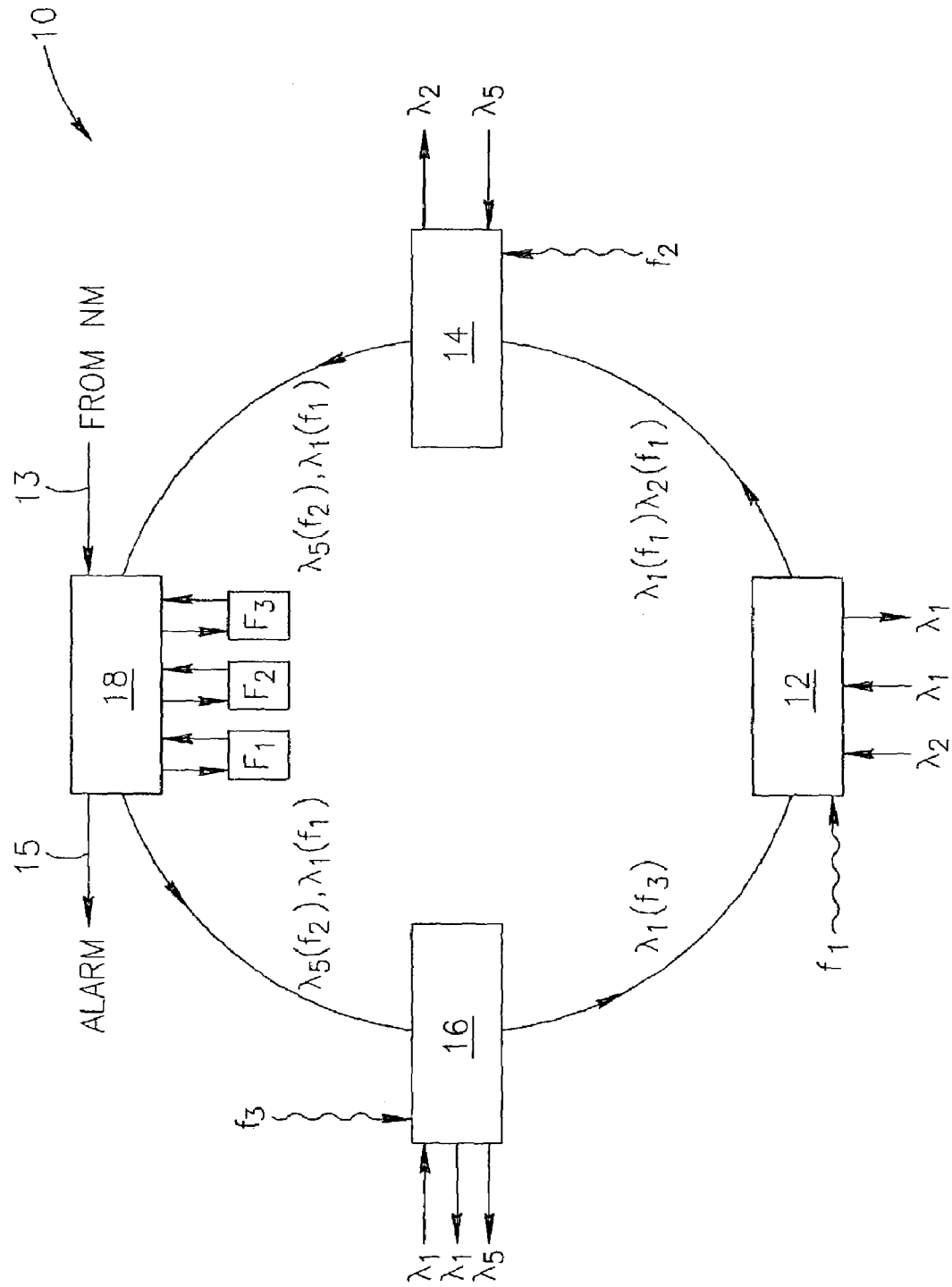
FIG. 1 schematically illustrates a simplified example of a ring network, adapted for detecting and locating faults at the network sections using various sub-carrier frequencies assigned to different nodes of the network.

FIG. 1 shows a ring-like network 10 where each of the network nodes of interest—12, 14, 16—comprises an OADM element and is provided with an ability of impressing the added data streams with a specific sub-carrier pilot tone f1, f2 and f3, respectively. The network also comprises a checking unit 18, which is illustrated as a stand-alone device.

In this exemplary embodiment, the unit 18 is provided with filters F1, F2, F3 which are capable of detecting whether any particular pilot tone exists on the span. The unit 18 will be able to serve as a fault detecting/locating one, if it receives from a Network Manager system (not shown) information called a correct network picture. In other words, the unit 18 is informed (arrow 13) whether any of the pilot tones should exist at this particular point and, using this information, decides whether there is a fault and where (alarm 15 being a local decision). The alarms can be forwarded to the Network Manger. For example, if a sub-carrier f1 must exist but is absent, an alarm signal may manifest either a fault in spans between nodes 12–14, 14–18, or a fault in the node 12. If the pilot tone f2 is present, there is no fiber cut in the span 14–18. To clarify whether there is a cut in the span 12–14 or in the node 12 itself, it would be necessary to have more fault detection and location devices.

Figure 2:
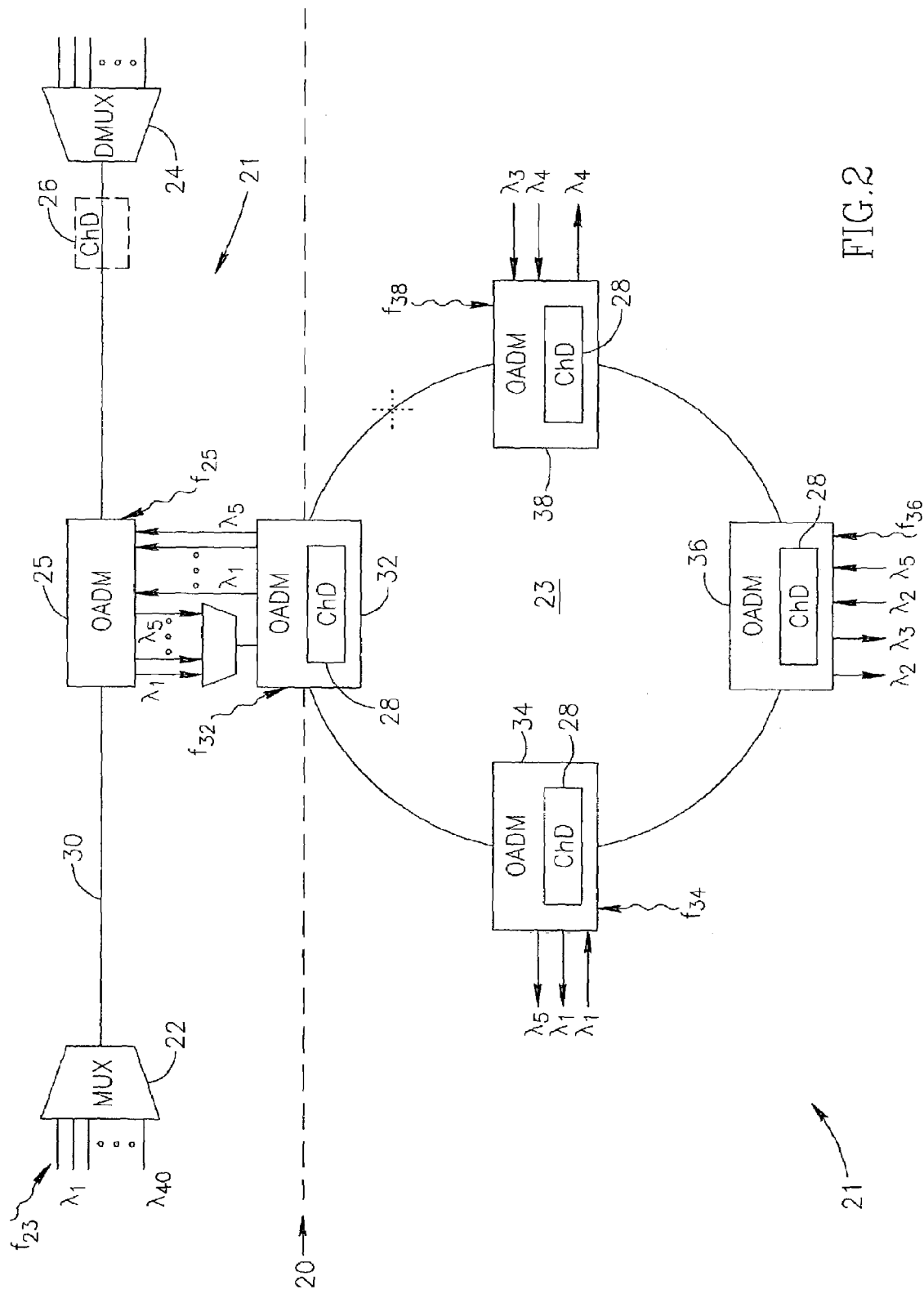
FIG. 2 schematically illustrates one optical network configuration being a combination of a point-to point architecture and a ring architecture with nodes comprising OADMs, the configuration is adapted for detecting and locating faults at any section of the network.
Figure 3:
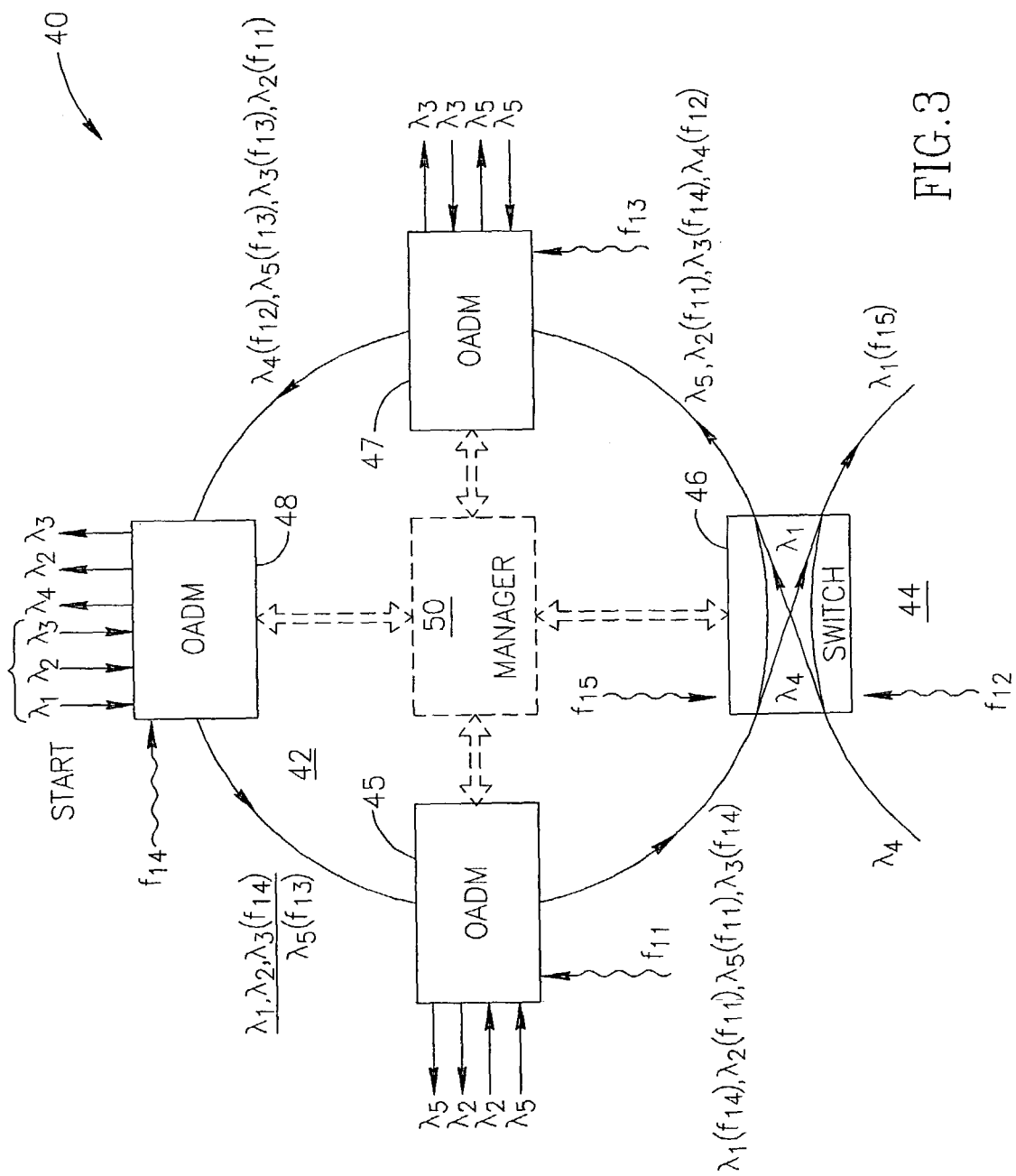
FIG. 3 schematically illustrates another configuration of two adjacent networks, interconnected by a switching device and adapted for detecting and locating faults.

It should be mentioned, that the fault detection and location unit 18 may be a separate stand-alone unit in the network (as shown in the drawing), but preferably it forms integral part of a network node. Therefore, each of the nodes 12, 14, 16 may comprise and preferably comprises both the equipment for adding the assigned sub-carrier to the added channels, and the equipment for analyzing which sub-carriers have arrived to the particular node. In such an embodiment, discrimination of the fault would be provided more accurately. FIGS. 2 and 3 will illustrate the last statement.

FIG. 2 shows a combined network configuration 20, comprising a point-to-point portion 21 between MUX 22 and DEMUX 24 and including OADM 25, and a ring portion 23 connected to the OADM NODE 32. The network portions are interconnected via OADMs 25 and 32. Presence of a checking device 26 on the point-to point portion, and of one or more checking devices 28 on the ring portion of the network allow detection faults at any span of the combined architecture.

In this example, the MUX 22 multiplexes a number of optical channels $\lambda 1$–$\lambda 40$ into an optical signal which can be transmitted via an optical fiber 30 in the point-to point configuration 21 which belongs to a first service provider. The optical channels, entered to the network at the terminal element, can be modulated by a sub-carrier pilot tone f23. The OADM 25 drops several optical channels ($\lambda 1$–$\lambda 5$) to be forwarded to customers of a second service provider, which are arranged in the ring network 23. In this embodiment, the OADM 25 adds the same optical channels ($\lambda 1$–$\lambda 5$) to the point-to point network 21, after the information transmitted via these channels from the MUX 22 is distributed in the ring network 23 and replaced by other information to be transmitted to the DMUX 24.

In this example, the ring configuration 23 includes OADM nodes 32, 34, 36 and 38, each equipped with means for impressing the added optical channels with a characteristic pilot sub-carrier tone: f32, f34, f36 and f38 respectively. In this network, each of the OADM nodes comprises a checking device 28 capable of analyzing which sub-carrier tones are present at the particular point of the network. Each of the checking devices is also informed which sub-carrier pilot tones must exist and which should be absent at each particular point of the network. The manner of informing them is not discussed in the frame of the present application. One of possible options is obtaining this information from a Network Manager (not shown). Another option is to provide each of the nodes with this "correct picture" information in a de-centralized manner, before starting the network.

If the checking device 26 detects absence of the pilot sub-carrier f25 (which is to be present), and presence of f23, it will be a signal of a fault, but will indicate that there is no fiber cut in the network 21 between the OADM 25 and the device 26. The fault may be either a fiber cut in the network 23 between OADM 32 and OADM 38, or a fault in the OADM 25 and/or 32 (a possible fiber cut is marked with a dotted cross). The location of the fault should be exactly pointed out to let a suitable service provider both to take care of it and to bear expenses connected to it. For example, to clarify the position of the fault, the checking device 28 of the OADM 32 should also be activated. In case the pilot sub-carriers f36, f34, f38 are absent at the OADM 32, and the OADM 32 itself is in operative condition (which can be confirmed if f32 is present in any of OADMs 34, 36, 38) the fault is definitely located in the network 23, between nodes 32 and 38. In this case, two local decisions confirm one another. Similarly, a specific fault of a particular NE (and not a fiber cut in the span outgoing the NE) can be located if at least one following NE detects sub-carrier pilot tone(s) which passed through the particular NE but does not detect a pilot tone assigned to the particular NE.

FIG. 3 illustrates a configuration 40, where a ring network 42 and a ring network 44 (shown partially) are connected via a switching device 46 which is shown most schematically. Optical channels, added and dropped in the network 42, are shown as (λ1–λ5) at the nodes of the network: OADM 45, switch 46, OADM 47 and OADM 48. The switching device adds to the network 42 an optical channel with λ4 which is switched from the network 44; in turn, λ1 is switched from the network 42 and added to the network 44. Optical channels, added at the nodes 45, 46, 47 and 48 are respectively "marked" (modulated) by sub-carriers f11, f12, f13 and f14, by suitable equipment situated at the nodes. A sub-carrier f15 is impressed to an optical channel carrying λ1 switched from the network 42 to the network 44 via the switch 46. Each of the nodes is provided with a monitoring block (not shown) for detecting pilot tones at the node. The system includes a Network Manager 50 in communication with the monitoring blocks of the nodes, for the information exchange. For example, each of the nodes 45, 46, 47, 48 comprises a memory in the monitoring block and holds a look-up table where information about the present and absent pilot tones can be registered. The Manager 50 will receive reports from each of the monitoring blocks about the current status of the nodes from the point of pilot tones.

For example, node 47 detected absence of the pilot tone f12 and presence of the tones f11 and f14 and reported it to the Manager 50. The Manager checks whether, according to the correct picture of the network, the pilot tone f12 must be present at the node 47. If not, it is a normal situation and no action is taken. If f12 must be present but is absent, there are two options—it is either a fiber cut between nodes 46 and 47, or a fault in the node 46. Further, the fault in the node 46 may be a pass fault (the switch does not output any signals) or a switching fault (the switch fails to perform the switching operation). The Manager's 50 decision is as follows: since the pilot tones f11 and f14 are present at the node 47, there is no pass fault in the node 46 and no fiber cut in the span between the nodes 46 and 47. Therefore, there is a switching fault in the switch 46. Upon detecting the fault and locating it for the network 42, the following actions may be taken. The Manager 50 may contact a Manager (not shown) of the network 44 to report on the absence of f12 (and therefore, the absence of λ4). The Manager of the network 44 may then check whether there is a fault in its network, and not obligatory in the switch 46. Any way, an alarm should be produced by the Manager 50 to inform the network's 42 operator on switching problems in the node 46. This alarm may be confirmed or complemented by another alarm which possibly will be received by an operator of the network 44 from its Manager.

Figure 4:
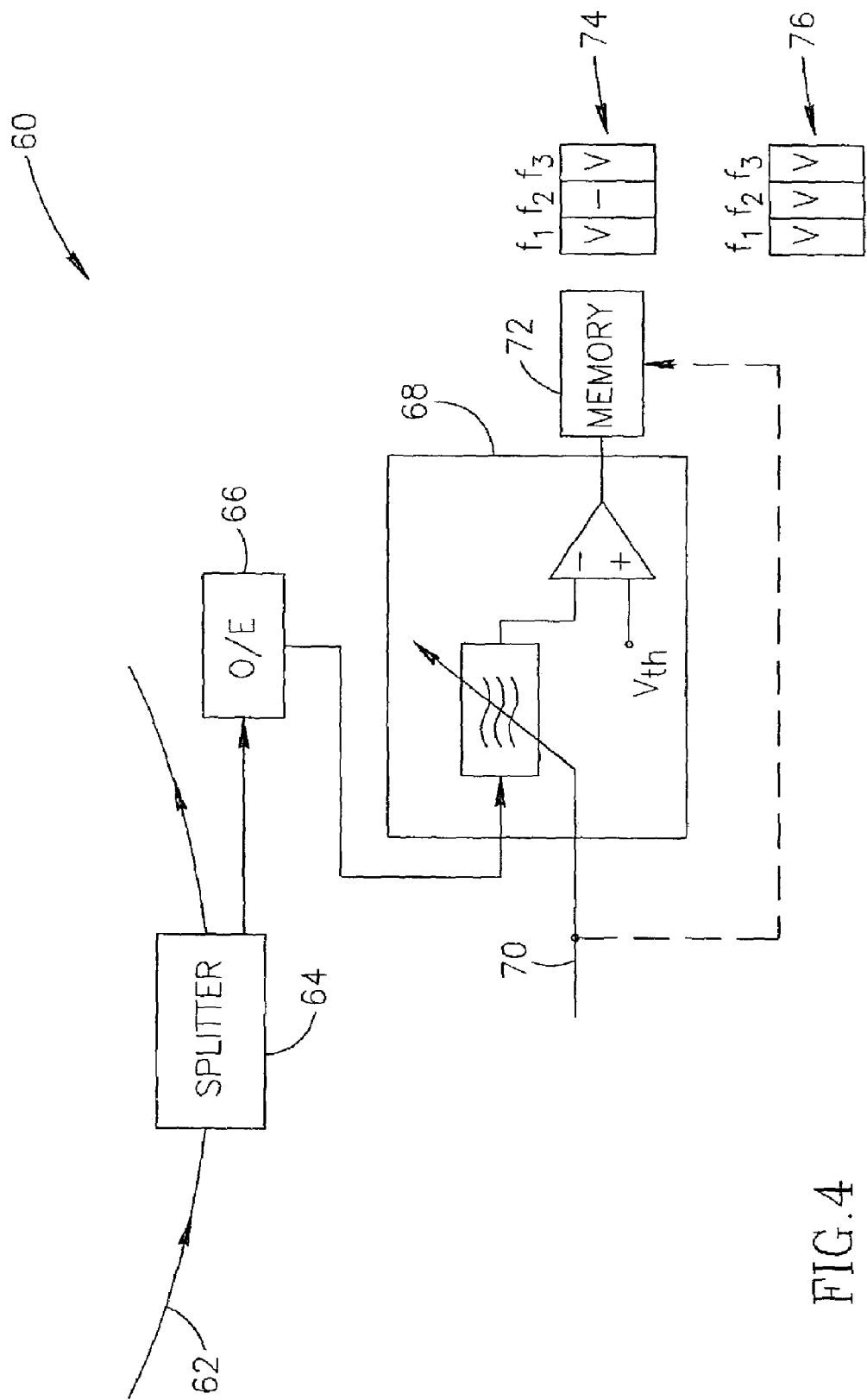
FIG. 4 schematically illustrates one exemplary implementation of the checking device according to the invention.

FIG. 4 illustrates one possible embodiment of a checking device (unit), or a monitoring block 60 which preferably forms part of the sub-carrier module and the node according to the invention. The optical signal arrives to the node via a fiber 62 and, upon splitting by a splitter 64, a portion of the optical signal is converted into an electric signal by an O/E converter 66. The obtained electric signal is fed to an adaptive filter 68 provided with a voltage control input 70. The adaptive filter is controlled so that it becomes sensitive to a number of different frequencies of the signal. In other words, it can be adapted to be ready to detect particular sub-carrier pilot tones, as desired at the particular node, by scanning the bandwidth and sequentially skipping from one frequency to another with changing the control voltage 70. Thus, whenever a particular pilot tone is detected by the adaptive filter 68, this fact is synchronously registered in a memory block 72. The detection can be performed using a threshold voltage Vth. The memory holds a sub-carrier pilot tones status table (schematically shown as 74; the registered pilot tones are marked by "V" in the table). Reporting the status table to the Network Manager would constitute a status report.

The checking device may optionally comprise a look-up table 76 located in the memory and reflecting a desired status of sub-carriers at the node. Such a table is actually a fragment of the correct picture of the network and can be either obtained from the Network Manager, or manually introduced in the unit. The checking device 60 can be designed to compare tables 74 and 76 and analyze the result, thus obtaining a local decision (alarm) on the fault and its location. The local decision can be further reported to the Network Manager. Optionally, both the status table 74 and the look-up table 76 can be reported to the Network Manager.

As shown in FIG. 4, the checking device determines the presence of a sub-carrier pilot tone using the threshold Vth. In addition, the checking device may comprise a circuitry (not shown) for measuring power of the detected particular sub-carrier pilot tone and comparing its power with a suitable predetermined expected power level. If such measurements are provided simultaneously with detecting the sub-carriers, the comparison results can be stored in a specific "power" table in the memory. Such a table can be periodically reported to the Network Manager and used for the network performance monitoring, for example for revealing a fiber degradation at specific sections of the network. Such tables obtained over the network can also be used for estimation and predicting effects caused by temperature changes.

The invention claimed is:

1. A method of detecting and locating faults in an optical multi channel network composed of network nodes, the method including:
assigning sub-carrier pilot tones to a number of the nodes comprising Network Elements NE, wherein each of said tones has a frequency different from those of multiple optical channels of the network and different from those of sub-carrier pilot tones assigned to other network nodes,
applying said different sub-carrier pilot tones to any signal added to the network via the respective nodes,
checking presence of one or more of the sub-carrier pilot tones at one or more points of the network, and,
based on results of the checking, locating a faulty section of the network in case a, fault occurred, wherein
the step of locating of a faulty section is based on detecting, at a particular point of the network, absence of a sub-carrier pilot tone which should be present at said point, said step of locating comprises:
relating said tone to the network section associated with the Network Element (NE) to which said tone is assigned, and
comparing the information on presence of one or more of the sub-carrier pilot tones with a correct picture of the network formed from information on the optical channels added and dropped at each of said Network Elements, and on sub-carriers assigned to each of said Network Elements.

2. The method according to claim 1, wherein said one or more points of the network are respectively positioned at one or more of said nodes.

3. The method according to claim 1, wherein the step of checking is accomplished by filtering at least a portion of the incoming optical signal for determining which sub-carrier pilot tone(s) are absent and which sub-carrier pilot tone(s) are present.

4. The method according to claim 1, wherein the comparing is performed with the aid of a Network Manager holding and updating the correct picture of the network.

5. The method according to claim 1, wherein the step of fault location comprises discriminating between a fiber cut occurring in a network span associated with the Network Element originating the sub-carrier detected to be absent, and between an equipment fault in said Network Element.

6. The method according to claim 1, additionally comprising a step of periodically measuring power of a particular sub-carrier pilot tone detected at a particular point of the network and comparing its power with a predetermined expected power level for monitoring of the network performance.

* * * * *